(12) United States Patent
Shuster (10) Patent No.: US 7,593,864 B2
(45) Date of Patent: Sep. 22, 2009

(54) METHOD AND APPARATUS FOR MANAGING OWNERSHIP OF VIRTUAL PROPERTY

(76) Inventor: Brian Mark Shuster, 120 Desni Ct., Stateline, NV (US) 89449

(*) Notice: Subject to any disclaimer, the term of this patent is extended or adjusted under 35 U.S.C. 154(b) by 1095 days.

(21) Appl. No.: 09/837,852

(22) Filed: Apr. 18, 2001

(65) Prior Publication Data
US 2001/0056383 A1 Dec. 27, 2001

Related U.S. Application Data

(60) Provisional application No. 60/198,490, filed on Apr. 18, 2000.

(51) Int. Cl.
*G06Q 30/00* (2006.01)
(52) U.S. Cl. ....................................... 705/26
(58) Field of Classification Search .................. 705/26, 705/27, 1; 365/94; 707/9, 10; 709/212, 709/213, 216–219; 711/100, 102, 103, 163, 711/164; 726/31
See application file for complete search history.

(56) References Cited

U.S. PATENT DOCUMENTS 6,135,646 A * 10/2000 Kahn et al. .................. 709/217
6,591,250 B1 * 7/2003 Johnson et al. ............... 705/51
2001/0025256 A1 * 9/2001 Oliphant et al. .............. 705/26

FOREIGN PATENT DOCUMENTS

WO WO 98/47091 * 10/1998

OTHER PUBLICATIONS

Drummond, Mike: "Tune Town | San Diego-based digital music provider emphasizes personal CD service", The San Diego Union-Tribune, San Diego CA, Apr. 4, 2000, p. 6.*

* cited by examiner

*Primary Examiner*—Mark Fadok
(74) *Attorney, Agent, or Firm*—Knobbe Martens Olson & Bear, LLP (57) ABSTRACT

A method and apparatus for managing ownership of virtual property accessible to users is provided by a computer-implemented system connected to a network. This method and apparatus further comprises maintaining an inventory of virtual properties, managing ownership of virtual properties, and allowing use of virtual properties by corresponding property owners within corresponding network spaces. In particular, virtual properties are purchased from a system by user computers, wherein virtual properties may be accessed by a user and/or sold or traded to other users which may include auction websites.

13 Claims, 4 Drawing Sheets

METHOD AND APPARATUS FOR MANAGING OWNERSHIP OF VIRTUAL PROPERTY

CROSS-REFERENCE TO RELATED APPLICATION

This application claims priority pursuant to 35 U.S.C. § 119(e) to U.S. Provisional Application No. 60/198,490, filed Apr. 18, 2000, which application is specifically incorporated herein, in its entirety, by reference.

BACKGROUND OF THE INVENTION

1. Field of the Invention

The present invention relates to the electronic commerce of virtual property. More specifically, this invention pertains to a method and apparatus for conducting electronic business, wherein the merchant manages use, sale, and ownership of virtual property that permanently resides on the merchant's computer system.

2. Description of Related Art

For many years, the global retail market has been characterized as a market in which physical products are sold from physical locations. In recent years, however, this dynamic has undergone a significant change in response to the increasing popularity of the Internet. It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols. As a result of the Internet, businesses can now sell their products to a vast number of customers beyond local boundaries. This form of business transaction is commonly known as electronic commerce and will herein be referred to as such. Systems for wide-area networks, such as the Internet, are presently limited, however, in the offerings that are made available to businesses and consumers. Present sales systems generally allow for the sale of physical goods or services, or for the purchase of a membership to access certain information or services.

Furthermore, the rapid growth of digital technology has introduced a new line of products that can be delivered in the form of digital information (e.g., music, paintings, movies, software, etc.). Digital information has a unique characteristic in that it can be copied by the owner an infinite number of times while the owner still retains the original. Music in a compact disc, for example, is simply stored digital information with each binary bit represented as the presence or absence of a sequence of holes (i.e., depressions that reflect light) appropriately located on the disc. As is generally known in the art, this same sequence can also be downloaded onto a computer. If this computer is equipped with software capable of decoding such sequences, the information represented by this sequence can be readily accessible. Commercial systems are available to purchase and download digital information via the Internet directly into a computing or entertainment system, thereby eliminating the need for physical embodiments of such products (e.g., discs, tapes, etc.).

An alternative to selling digital information is to sell subscriptions or memberships to sites that supply digital information. These membership sites do not sell ownership of the digital information, but merely allow access to the content that they display. For many types of information, such as news that only has value for a short period of time, a membership or subscription provides an attractive solution for many consumers.

Another type of digital information exists that is referred to herein as virtual property. Unlike the aforementioned forms of digital information, virtual property has no counterpart in the physical world and exists only within the virtual realm. For example, it is known in the art to provide a multi-player game managed by a server operating on the Internet. The players would access the game through their computing devices connected to the Internet. Within the context of the game, players may create a persona or character that has certain characteristics, strengths, and capabilities. Players may also obtain certain objects (e.g., keys, weapons, etc.) in the course of the game. These character attributes and objects have no counterpart in the physical world and only have value in the virtual world associated with the game. Although there is some intrinsic value for these character attributes and objects, there is no market for such virtual property and hence no way to transfer ownership or use.

In general, two issues arise when dealing with virtual property. First, a business must concern itself with the unauthorized copying of these properties. By sending a copy of the virtual property to the buyer or subscriber, the merchant loses control of the data, making possible the duplication and distribution of illegal copies of the property, for which the merchant is not compensated. Second, a business is limited to selling its virtual properties to those consumers with computing resources capable of decoding different types of digital data and capable of storing this data. With the increasing popularity of the mobile workstation (with limited computing resources), this issue becomes even more prevalent.

Currently, no system exists that allows the purchase and ownership of property rights that are entirely digital in nature and that have no value outside of the digital environment in which they exist. Furthermore, no system exists where such properties are maintained by the merchant and are not downloaded to the buyer's computer. It would thus be advantageous to implement a virtual marketplace where these virtual property rights can be transferred, used, and managed requiring minimal computing resources from the consumer and where merchants are protected from the unauthorized duplication of their virtual properties.

SUMMARY OF THE INVENTION

The present invention is directed towards a method and apparatus for implementing a virtual marketplace and more particularly towards managing ownership of virtual property.

In an embodiment of the invention, a method and apparatus for managing ownership of virtual property accessible to users is provided by a computer-implemented system connected to a network. This method and apparatus further comprises maintaining an inventory of virtual properties, managing ownership of virtual properties, and allowing use of virtual properties by corresponding property owners within corresponding network spaces. In particular, virtual properties are purchased from a merchant computer system by user computers, wherein these virtual properties may be accessed by a user and/or sold or traded to other users which may include auction websites.

A more complete understanding of a method and apparatus for managing ownership of virtual property will be afforded to those skilled in the art, as well as a realization of additional advantages and objects thereof, by a consideration of the following detailed description of the preferred embodiment.

Reference will be made to the appended sheets of drawings which will first be described briefly.

DETAILED DESCRIPTION OF THE PREFERRED EMBODIMENT

The present invention is directed towards a method and apparatus for managing ownership of virtual property. In particular, this invention fulfills the need for a virtual marketplace where the use of virtual property requires minimal computing resources from the consumer and where merchants are protected from the unauthorized duplication of their virtual properties. As a result, this invention enables businesses to provide a service where virtual properties can be purchased, sold, traded, or accessed without compromising the computing resources of the user computer. In the detailed description that follows, it should be appreciated that like element numerals are used to describe like elements illustrated in one or more figures.

Figure 1:
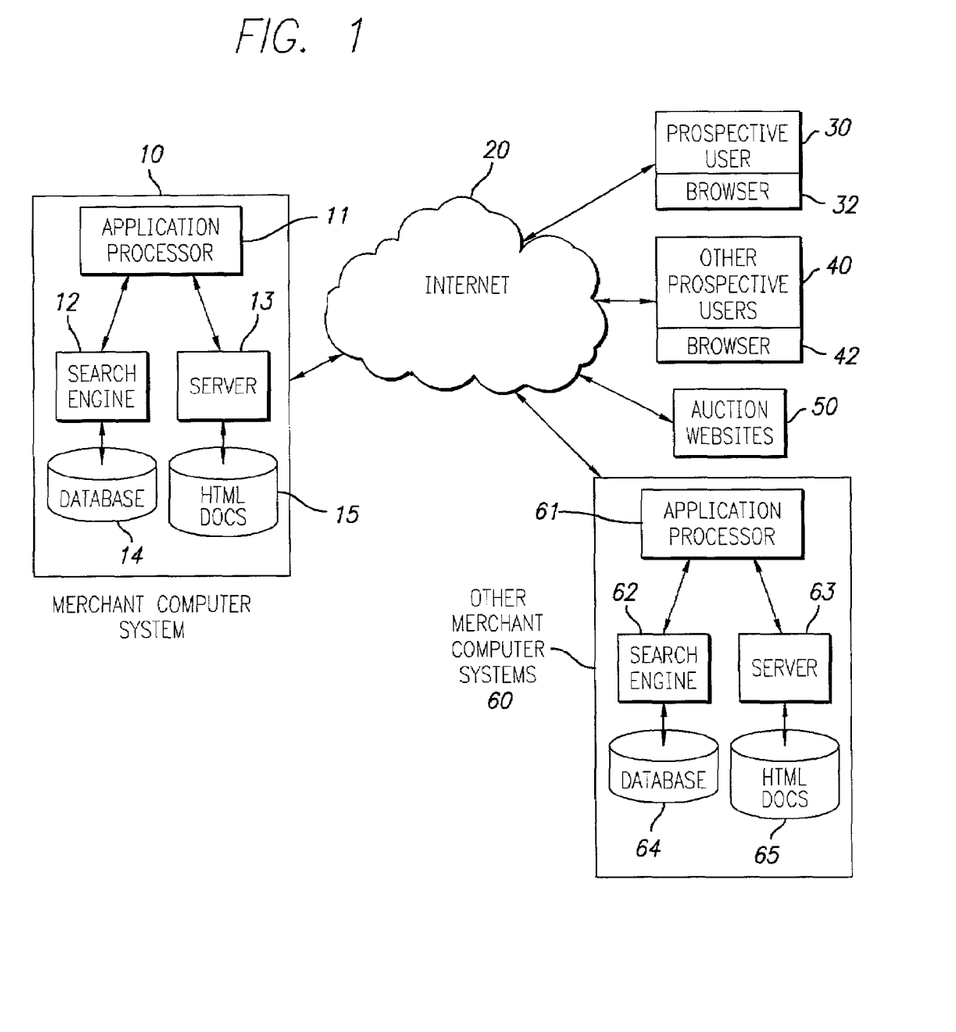
FIG. 1 is a block diagram demonstrating a preferred embodiment of the invention.

Referring first to FIG. 1, a block diagram is illustrated of a wide area network employing a method and apparatus according to an embodiment of the invention. It is anticipated that the present invention operates with a plurality of computers which are coupled together on a wide area network, such as the Internet 20, or other communications network. FIG. 1 depicts such a network which includes a merchant computer system 10 that communicates with prospective users 30 and 40, auction websites 50, and other merchant computer systems 60 via the Internet 20. It should be appreciated that user computers 30 and 40 may be any type of computing device that allows a user to interactively browse websites, such as a personal computer (PC) that includes a Web browser 32 and 42 (e.g., Microsoft Internet Explorer™ or Netscape Communicator™). Suitable user computers 30, 40 equipped with browsers 32, 42 are available in many configurations, including handheld devices (e.g., PalmPilot™), personal computers (PC), laptop computers, workstations, television set-top devices, multi-functional cellular phones, and so forth.

In a preferred embodiment, a merchant computer system 10 is further comprised of an applications processor 11, a search engine 12, a web server 13, a business database 14, and an HTML (Hyper-Text Markup Language) documents database 15. As illustrated, merchant computer system 10 is internally connected such that the applications processor 11 directly communicates with both the search engine 12 and the Web server 13. Furthermore, search engine 12 is shown to be connected to business database 14, while server 13 is shown to be connected to HTML documents database 15. It should be noted that other merchant computer systems 60 are also shown in FIG. 1. As illustrated, these systems 60 have a similar structure to the structure described for merchant computer system 10.

It should be appreciated that search engines 12 and 62 typically incorporate a database engine, such as a SQL Server™ engine from Microsoft Corporation or Oracle™ database engine, as part of their architecture. Search engines typically perform searches by operating on a string of characters, known as a "query string." A query string is coded according to a set of rules determined by the database engine and/or a user interface between the database engine and the user. As used herein, a "query" is broader than a "query string," denoting both the query string and the search logic represented by the query string, whereas "query string" refers only to a string of characters, symbols, or codes used to define a query.

It should be further appreciated that Web servers 13, 63 respectively access a plurality of Web pages, distributable applications, and other electronic files containing information of various types stored in HTML documents database 15, 65. As a result, Web pages may be viewed on various user computers 30, 40; for example, a particular Web page or other electronic file may be viewed through a suitable application program residing on a user computer 30, 40, such as a browser 32, 42, or by a distributable application provided to the user computer 30, 40, by Web server 13, 63 respectively. It should be appreciated that many different user computers, many different Web servers, and many different search servers of various types may be communicating with each other at the same time.

As is generally known in the art, a user identifies a Web page that is desired to be viewed at the user computer 30, 40 by communicating an HTTP (Hyper-Text Transport Protocol) request from the browser application 32, 42. The HTTP request includes the Uniform Resource Locator (URL) of the desired Web page, which may correspond to an HTML document stored in the merchant's HTML document database 15, 65. The HTTP request is routed to the merchant's Web server 13, 63, via the Internet 20. The Web server 13, 63 then retrieves the HTML document identified by the URL, and communicates the HTML document across the Internet 20 to the browser application 32, 42. The HTML document may be communicated in the form of plural message packets as defined by standard protocols, such as the Transport Control Protocol/Internet Protocol (TCP/IP).

In a preferred embodiment of the invention, virtual properties are either purchased, sold, traded, or accessed by a user 30 from any location that has the ability to connect with the merchant computer system 10. As a result, management of these properties are not limited to the location from which the merchandise has been ordered. When making a purchase, users 30 select virtual properties from a merchant's database 14 using a search engine 12. Once this property is purchased, that property can be freely accessed, sold, or traded by the user 30 through the merchant's website. It should, however, be appreciated that the operation and maintenance of such virtual property remains the responsibility of the merchant. In this respect, it should be further understood that the actual operation of these properties are performed within the computer system 10 of the merchant, and in particular through the system's application processor 11.

Figure 2:
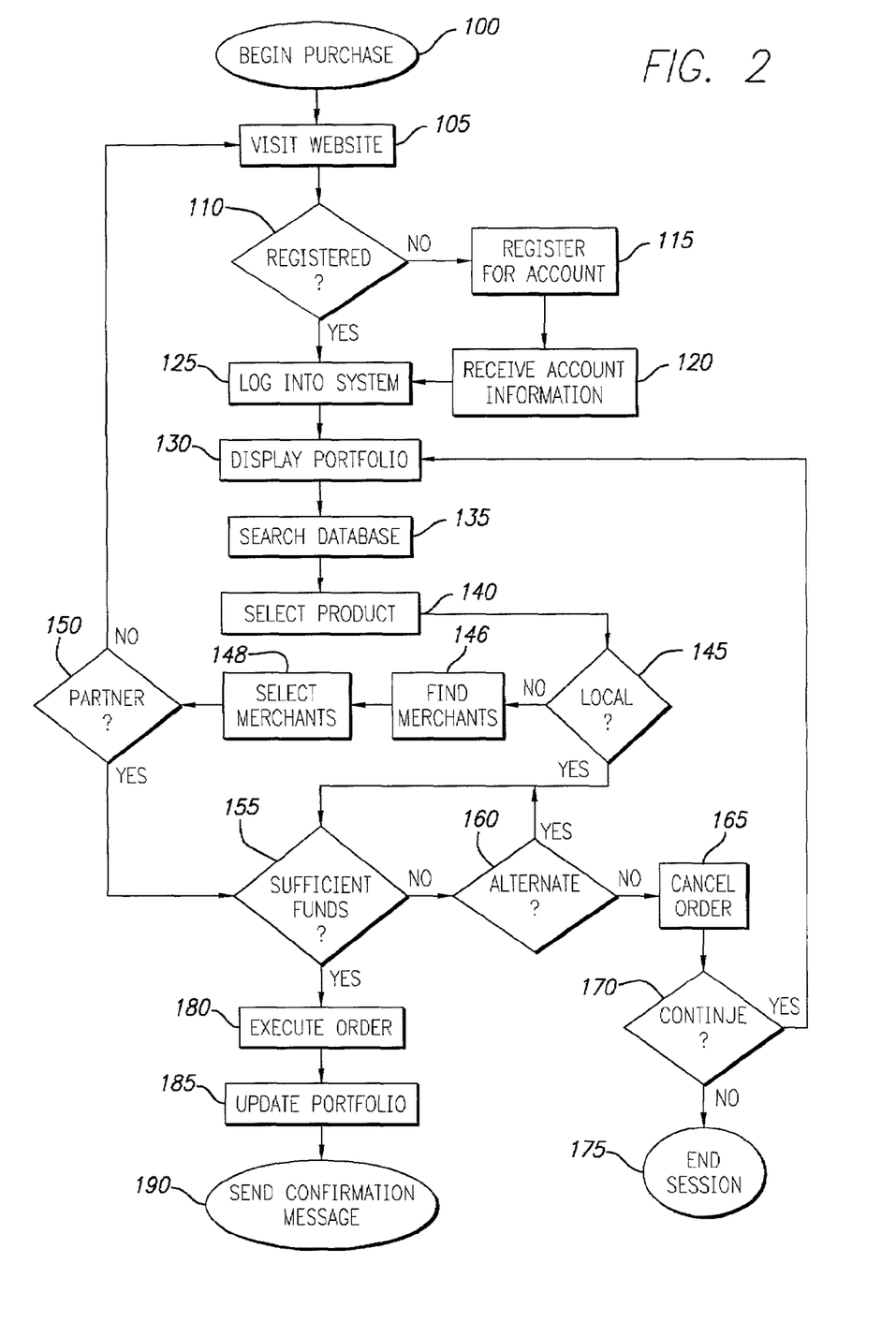
FIG. 2 is a flow chart outlining the steps for making a purchase of virtual property according to a preferred embodiment of the invention.

In FIG. 2, a flow chart illustrating the steps for making a purchase according to an embodiment of the invention is shown. The purchasing procedure begins at step 100 and continues with the prospective user 30 visiting the merchant's website at step 105. At step 110, the merchant computer system 10 then determines whether the prospective user 30 has a registered account. If the prospective user 30 does indeed have an existing account, the user 30 logs into the system 10 at step 125; otherwise, the user 30 registers for an account at step 115, receives account information (e.g., username, password, etc.) at step 120, and finally logs into the system 10 at step 125. Once the user 30 is logged into the system 10, a portfolio illustrating the user's 30 virtual properties maintained with the merchant is displayed at step 130. The user 30 is then permitted to search through the merchant's database 14 using a search engine 12 at step 135. At step 140, the desired virtual property is then selected by the user 30.

In a preferred embodiment of the invention, all virtual properties displayed to the user 30 from the merchant's database 14 are either directly available from the current merchant or indirectly available through another merchant. As a result, the merchant computer system 10 must determine whether the selected property is currently available within its own inventory at step 145. If the merchant has this property readily available, then the procedure continues with a charge being applied to the user's 30 credit card at step 155; otherwise, the merchant computer system 10 finds other merchants with the desired property at step 146 and lists them to the user 30. Once this list of other merchants is displayed at step 146, the user 30 selects which of these other merchants it wants to purchase the desired property from at step 148.

In a preferred embodiment of the invention, the other merchants displayed to the user 30 may be "partners" with the current merchant. Here, a partner is defined as a merchant with a pre-existing arrangement to accept invoice orders directly from the computer system 10 of the current merchant. Therefore, after the user 30 selects which of the other merchants it wants to purchase the desired property from at step 148, the merchant computer system 10 must determine whether the selected merchant is a partner at step 150. If it is determined that this particular merchant is indeed a partner at step 150, the procedure continues with a charge being applied to the user's 30 credit card at step 155; otherwise, the user 30 is hyper-linked to the other merchant's computer system 60 at step 105 where the described procedure is repeated from within the computer system 60 of the other merchant.

If sufficient funds are available at step 155, the order is executed at step 180; otherwise, the user 30 is asked to use an alternate credit card at step 160. If the user 30 chooses to enter an alternate credit card at step 160, the procedure returns to step 155 where these funds are now charged to the alternate credit card; otherwise, the order is cancelled at step 165. After the order is cancelled at step 165, the user 30 is asked if it wants to continue with the current session. If the user 30 decides to continue at step 170, then the procedure returns to step 130 where the user 30 is again displayed a personalized portfolio of its virtual properties with that particular merchant; otherwise, the session is ended at step 175. However, if sufficient funds are indeed available at step 155 and the order is executed at step 180, then the procedure continues with an update of the user's 30 portfolio at step 185. Finally, at step 190, a confirmation message is sent to the user 30 regarding the execution of this order.

Figure 3:
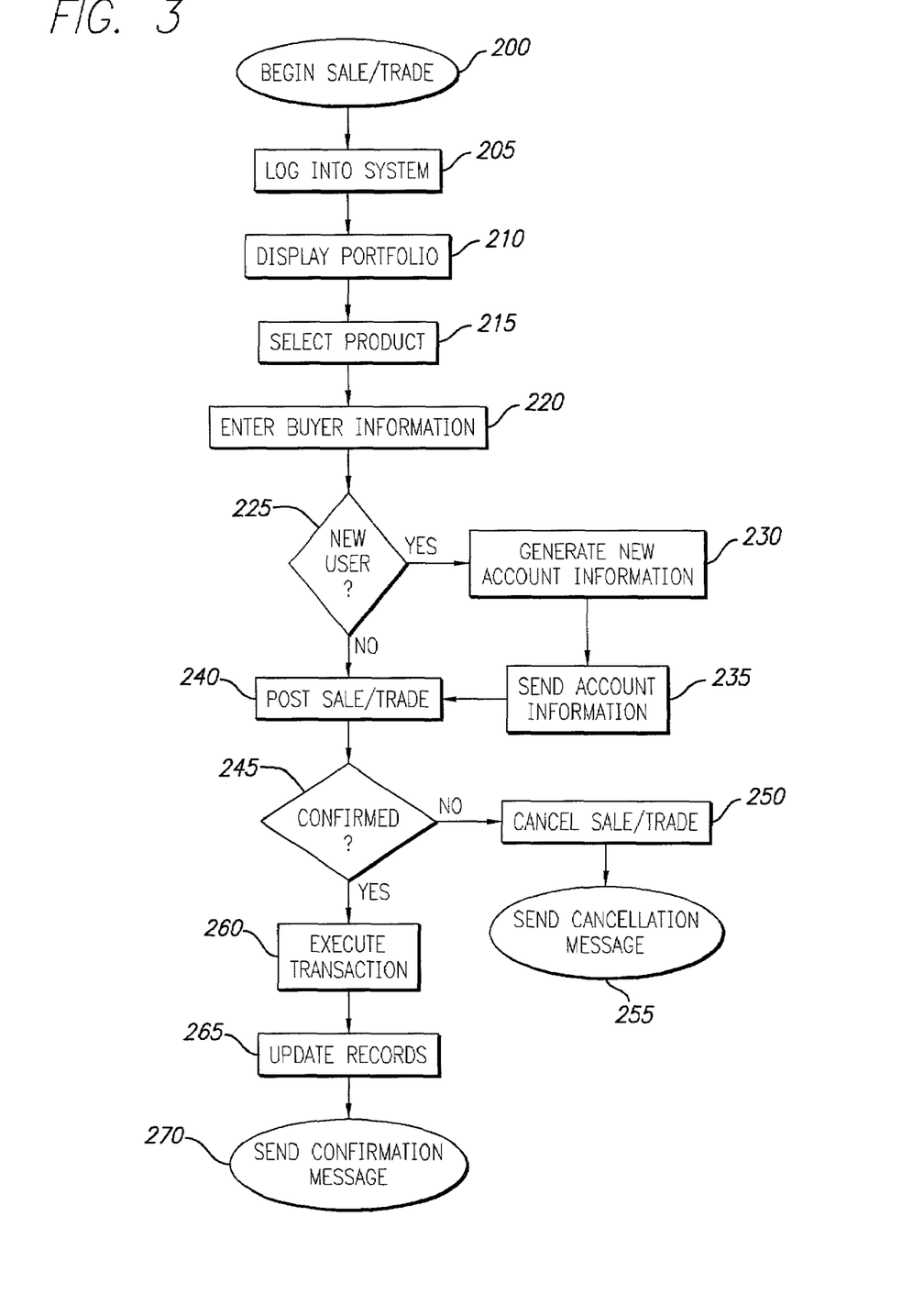
FIG. 3 is a flow chart outlining the steps for selling or trading of virtual property according to a preferred embodiment of the invention.

In a preferred embodiment of the invention, users 30 can openly sell or trade their virtual properties via the Internet 20. In FIG. 3, a flow chart describing this procedure is shown. This procedure begins at step 200 and continues with the user 30 logging into the merchant computer system 10 at step 205. Once the user 30 is logged into the system 10, a portfolio illustrating the user's 30 virtual properties with the merchant is displayed at step 210. The user 30 then selects the desired virtual property it intends to sell/trade at step 215. Next, the user 30 enters information regarding the intended buyer/trader of the selected property at step 220. In a preferred embodiment, it should be appreciated that a plurality of auction websites 50, directly linked to the merchant computer system 10, can all be potential buyers/traders of the user's 30 selected property. As a result, the user 30 has the option of choosing a buyer/trader from these auction websites 50 in addition to other specific users 40 at step 220.

Once the user 30 has entered all the required buyer/trader information at step 220, the merchant computer system 10 must determine whether the potential buyer/trader is a new user to the system 10 at step 225. If the potential buyer/trader is indeed a new user, the merchant computer system 10 generates a new account for the user at step 230, sends this account information to the new user at step 235, and posts the sale/trade via the Internet 20 at step 240; otherwise, the system 10 bypasses steps 230 and 235 and proceeds directly to step 240.

It should be appreciated that the "posting" of a sale/trade at step 240 entails communicating all conditions of the sale/trade with the potential buyer/trader. Such conditions will include details such the price of the particular sale or the property for which the desired property is going to be traded for. The procedure then continues once a response is received from the potential buyer/trader regarding these conditions at step 245. If the transaction is confirmed by the potential buyer/trader at step 245, then the transaction is executed at step 260; otherwise, the transaction is cancelled at step 250 and a cancellation message is sent to the user 30 at step 255. After a transaction is executed at step 260, the merchant computer system 10 must update its records to reflect this transaction at step 265. Finally, a confirmation message regarding this transaction is sent to both the user 30 and the buyer/trader at step 270.

Figure 4:
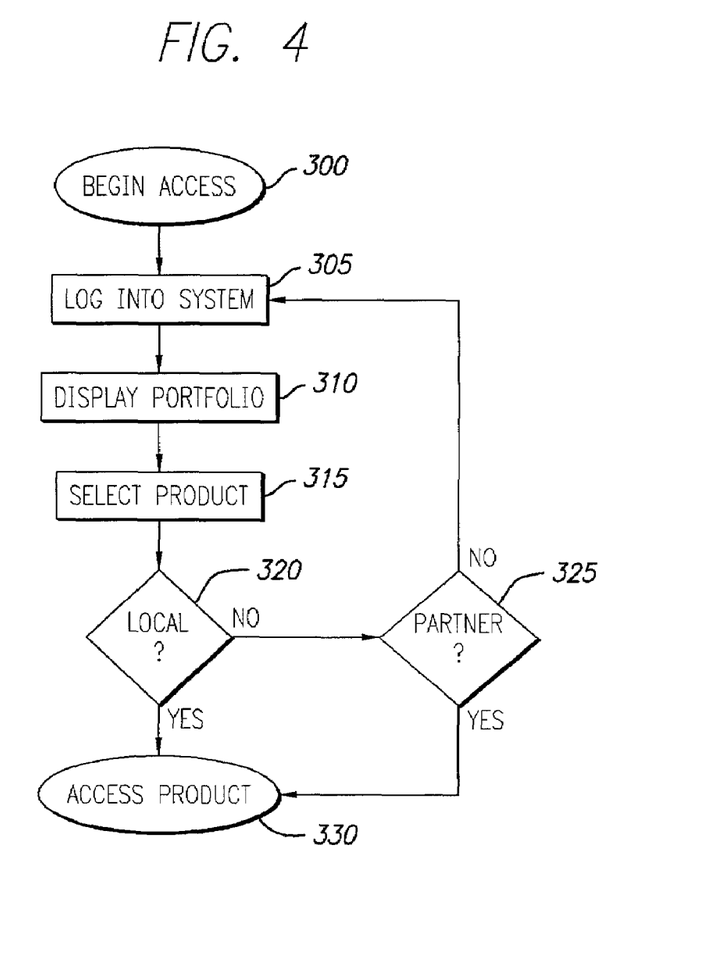
FIG. 4 is a flow chart outlining the steps for accessing virtual property according to a preferred embodiment of the invention.

Once a user 30 has acquired a virtual property, either through a purchase or a trade, that property may be freely accessed by the user 30 from the merchant computer system 10. In FIG. 4, a flow chart illustrating the steps for accessing these properties according to an embodiment of the invention is shown. This procedure begins at step 300 and continues with the user 30 logging into the merchant computer system 10 at step 305. Once the user 30 is logged into the system 10, a portfolio illustrating the user's 30 virtual properties managed by the merchant is displayed at step 310. The user 30 then selects the desired property it intends to access at step 315.

Similar to the procedure for making a purchase, all virtual properties displayed to the user 30 from the merchant's database 14 are either directly accessible from the current merchant or indirectly accessible through another merchant. As a result, the merchant computer system 10 must determine whether the selected property resides within its own inventory at step 320. If this property does indeed reside within the merchant's own inventory, then the procedure continues with the property being accessed at step 330; otherwise, the merchant computer system 10 determines whether the remote location of the desired property resides on a partner computer system 60 at step 325.

It should be appreciated that, although a particular property, remotely located on a partner's computer system 60, can be accessed directly from the current merchant's computer system 10, the physical location of this particular property remains within the partner's computer system 60. Therefore, if it is determined that a particular merchant is indeed a partner at step 325, the procedure continues with the desired property being accessed from the remote merchant's computer system 60 via the current merchant's computer system 10 at step 330; otherwise, the user 30 is hyper-linked to the other merchant's computer system 60 at step 305 where the described procedure is repeated from within the computer system 60 of the other merchant.

Within the context of the aforementioned flow charts, it should be appreciated that a plurality of embodiments describing several different types of virtual properties can be given. In one such embodiment, a merchant could sell software applications that are maintained and operated on the merchant computer system 10 via the Internet 20. Once a user purchases the software, that user would then be able to launch and run the software through their portfolio from any computer system 30 with a browser applications 32. In this type of embodiment, it is understood that the desired software must be implemented with a programming language compatible with remote access (e.g., Java).

Since the user is accessing the desired software remotely through its connection with the merchant computer system 10, there is never a need to download this software onto the user's computer 30. As a result, the user will have no ability to copy the software. If the software generates files, those files could be stored on either the user's computer 30, the merchant's computer 10, or a third party's computer depending on the agreement at the time of purchase. Unlike application service providers (ASPs) that sell subscriptions or memberships to sites that provide these services, this invention enables users to actually own these virtual software properties and manage them accordingly.

By way of example, a user could purchase access to a word-processing program from a software merchant. The user may then have an icon and manual for said software within their portfolio with that merchant. Whenever the user wants to use this program, it would simply log into the merchant computer system 10 and access the desired software. The software would then open within their browser 32 enabling the user to employ its various features directly from the merchant computer system 10. However, if the owner of this word-processing program ever wanted to sell or trade this property, this transaction would be easily made using the flow chart described in FIG. 3. It should be appreciated that once a user relinquishes ownership of this software, the user also relinquishes all access rights it previously had to that particular software. The new owner of the software then has all access rights to the software.

In another embodiment, this invention may be used by a merchant of multiplayer Internet games. In an adventure game, for example, a character may find an object, which is a very rare object in this adventure game. Within the game context, this character "owns" this object which is in itself a type of virtual property. Namely, this object is intangible and physically non-existent in the real world, but it still may have value to someone in the real world who would like to participate in this adventure game.

In particular, a participant in this game may wish to trade one of its virtual properties (e.g., a weapon, key, etc.) for this object or simply purchase the object from its owner (i.e., the player who found it). Once a player owns a particular virtual property, that property is included in that player's portfolio until the end of the game or until it is sold or traded (although some embodiments may include games where certain virtual properties can be carried over into the next game, another type of game, or some variant thereof). It should also be appreciated that a particular game may be operating on a server not maintained by the merchant managing the aforementioned virtual properties. In such cases, there needs to be communication between the merchant and the game server to verify ownership of these virtual properties and authority to use them in the game. It should be further appreciated that this verification step may be implemented within step 325 of the flow chart illustrated in FIG. 4 if needed.

In another embodiment, digital trading cards containing a variety of images and information regarding individual cards can be purchased, sold, traded, or accessed via the Internet. Here, it is understood that although these digital trading cards are analogous to physical trading cards which are well known (such trading cards are particularly common in the sports industry), digital trading cards are unique in that they exist only within the virtual realm. In the physical world, trading card merchants typically produce a limited number of each trading card which are sold in "packs" containing a certain number of randomly selected trading cards.

If packs of cards are offered in an embodiment, a merchant could offer sets of numerous unknown cards for sale, which are randomly selected based on a particular weighting system. Within this embodiment, it should be appreciated that a buyer may own multiple copies of the same digital trading card. In these cases, the buyer's on-line portfolio would display multiple owned copies of the same digital trading card. The owner may then offer to sell or trade these excess cards to another buyer, put these cards up for auction via an auction website 50, or simply keep the multiple copies of that particular card (perhaps with aspirations that the card will appreciate in value).

The digital trading cards may also be used as part of a multi-player game that is accessible via a game server. The digital trading cards may be "won" or "lost" throughout the course of a particular game. Within the context of such games, it is well known that certain game cards can be played versus other game cards in order to win ownership of that particular card. In an embodiment of this invention, these games may be played over the Internet 20 where the virtual ownership of these cards is managed by the merchant computer system 10 as dictated by the course of the game. It should be appreciated that the transfer of ownership associated with "winning" or "losing" a particular card would be analogous to the procedure for the sale or trade of a virtual property previously described in the flow chart of FIG. 3. It should be further appreciated that in this type of embodiment, a merchant computer system 10 will determine the confirmation of a particular game card transaction (i.e., the winning or losing of a card) at step 245 of FIG. 3 according to the rules and restrictions of the game being played.

In another embodiment, virtual movies, having no physical counterpart, may be 11 managed by a particular merchant via the Internet 20. Within this embodiment, virtual movies may be viewed by the user 30 using software residing on the merchant computer system 10 through the user's Web browser application 32. In order to purchase a virtual movie, prospective users 30 would access their accounts with the merchant computer system 10. Rather than requiring the virtual movie to be downloaded to the user's computer 30, the merchant would provide the user with an access code used to verify the identity of the user. From that point forward, the user would be the owner of the virtual movie and would thus have all rights of ownership to that virtual movie, including the right to resell its ownership to another party.

Sale of ownership could entail a simple transaction, such as transferring the proof of ownership codes to the buyer, or it can entail a more elaborate transaction, such as transfer of ownership codes, and the registration of such transfer with the merchant. New ownership codes could be distributed in an automated fashion to the new owner, which transaction could effect the deactivation of old codes.

Having thus described a preferred embodiment of a method and apparatus for managing ownership of virtual property, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for managing virtual properties that exist solely in a virtual form within a computer network and that have no physical counterparts, comprising:

provide virtual properties configured for use in a computer game operable in a memory of a game server, said virtual properties existing solely in virtual form within a computer network;

assigning ownership of the virtual properties to a plurality of property owners participating in the computer game, said ownership configured through said computer game such that said property owners are permitted to use said virtual properties in said computer game but are not permitted to possess a digital copy of any of said virtual properties;

maintaining an inventory of said virtual properties in a centralized database accessible by said property owners via a network connection;

allowing said property owners to transfer ownership of their respective virtual properties via said network connection; and maintaining updated records regarding ownership of said virtual properties in said centralized database wherein said step of allowing said property owners to transfer ownership comprises allowing at least one of said property owners to win one of said virtual properties from another property owner in the course of a game.

2. The method of claim 1, wherein said step of maintaining an inventory comprises searching for a desired one of said virtual properties within said inventory.

3. The method of claim 1, wherein said step of maintaining updated records regarding ownership comprises associating said virtual properties with respective ones of said property owners.

4. The method of claim 1, wherein said step of allowing said property owners to transfer ownership comprises allowing said property owners to sell their respective virtual properties to buyers.

5. The method of claim 1, wherein said step of allowing said property owners to transfer ownership comprises allowing said property owners to trade their respective virtual properties for other ones of said virtual properties.

6. The method of claim 1, further comprising the step of coordinating with partners via said network to identify additional virtual properties not included in said inventory.

7. A computer-implemented system for managing virtual properties that exist solely in a virtual form within a computer network and that have no physical counterparts, comprising:

a server connected to a network accessible by plural property owner computers; and an application program operable with said server to provide the functions of:

providing virtual properties configured for use in a computer game operable in a memory of said server, said virtual properties existing solely in virtual form within a computer network;

assigning ownership of the virtual properties to a plurality of property owners participating in the computer game, said ownership configured through said computer game such that said property owners are permitted to use said virtual properties in said computer game but are not permitted to possess a digital copy of any of said virtual properties;

maintaining an inventory of said virtual properties in a centralized database via said network;

allowing said property owners to transfer ownership of their respective virtual properties via said network connection;

maintaining updated records regarding ownership of said virtual properties in said centralized database; and allowing said property owners to use but not possess digital copies of said respective virtual properties within corresponding network spaces wherein said allowing property owners to transfer ownership function comprises allowing at least one of said property owners to win one of said virtual properties from another property owner.

8. The system of claim 7, further comprising a memory connected to said server and having a database of all said virtual properties maintained by said computer system.

9. The system of claim 7, wherein said maintaining an inventory function comprises searching for a desired one of said virtual properties within said inventory.

10. The system of claim 7, wherein said maintaining updated records regarding ownership function comprises associating said virtual properties with respective ones of said property owners.

11. The system of claim 7, wherein said allowing property owners to transfer ownership function comprises allowing said property owners to sell their respective virtual properties to buyers.

12. The system of claim 7, wherein said allowing property owners to transfer ownership function comprises allowing said property owners to trade their respective virtual properties for other ones of said virtual properties.

13. The system of claim 7, further comprising the function of coordinating with partners via said network to identify additional virtual properties not included in said inventory.

* * * * *

UNITED STATES PATENT AND TRADEMARK OFFICE
CERTIFICATE OF CORRECTION

| | |
|---|---|
| PATENT NO. | : 7,593,864 B2 |
| APPLICATION NO. | : 09/837852 |
| DATED | : September 22, 2009 |
| INVENTOR(S) | : Brian Mark Shuster |

It is certified that error appears in the above-identified patent and that said Letters Patent is hereby corrected as shown below:

Column 7, Line 11, change "applications" to --application--.

Columns 7-8, Lines 53-67 and 1-2, delete "In particular.... if needed." and insert the same on Col. 7, Line 52, after "game." as a continuation of paragraph.

Column 8, Line 46, after "may be" delete "11".

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,593,864 B2                           Page 1 of 1
APPLICATION NO.  : 09/837852
DATED            : September 22, 2009
INVENTOR(S)      : Brian Mark Shuster It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1477 days.

Signed and Sealed this

Twenty-eighth Day of September, 2010

David J. Kappos
*Director of the United States Patent and Trademark Office*